United States Patent

Garcia, Jr.

[15] 3,648,483
[45] Mar. 14, 1972

[54] OVERLOAD FRICTION COUPLING

[72] Inventor: Roger Garcia, Jr., Pittsfield, Mass.
[73] Assignee: General Electric Company
[22] Filed: June 1, 1970
[21] Appl. No.: 42,285

[52] U.S. Cl. ................................................................64/30
[51] Int. Cl. ....................................................F16d 7/02
[58] Field of Search ......................................................64/30

[56] References Cited

UNITED STATES PATENTS

| | | | |
|---|---|---|---|
| 2,763,141 | 9/1956 | Dodge | 64/70 |
| 2,901,912 | 9/1959 | Digby | 64/30 X |
| 2,127,768 | 8/1938 | Debrie | 64/30 RA |

*Primary Examiner*—Edward G. Favors
*Attorney*—Francis K. Richwine, Carl W. Baker, Frank L. Neuhauser, Oscar B. Waddell and Joseph B. Forman

[57] ABSTRACT

The overload friction coupling employs a tubular sleeve having an axial abutment and clamping nut securing therebetween two opposed Bellville springs, a spring carrier, two pairs of expanding and contracting wedge rings, and a spacer washer between the rings. With the axial clamping pressure of the Bellville springs, the rings will contract into engagement with the sleeve and simultaneously expand into engagement with the inner cylindrical surface of a spur gear. With the sleeve keyed to a motor shaft, the spur gear is securely supported at its opposite axial ends, due to the spacer ring, along cylindrical bearing and torque transmitting surfaces. The torque at which the coupling will slip, that is provide relative rotational movement between the gear and shaft, is predetermined by the axial pretensioning of the Bellville springs, which in turn is determined by the degree to which the adjusting nut is threaded on to the sleeve.

11 Claims, 1 Drawing Figure

Patented March 14, 1972  3,648,483
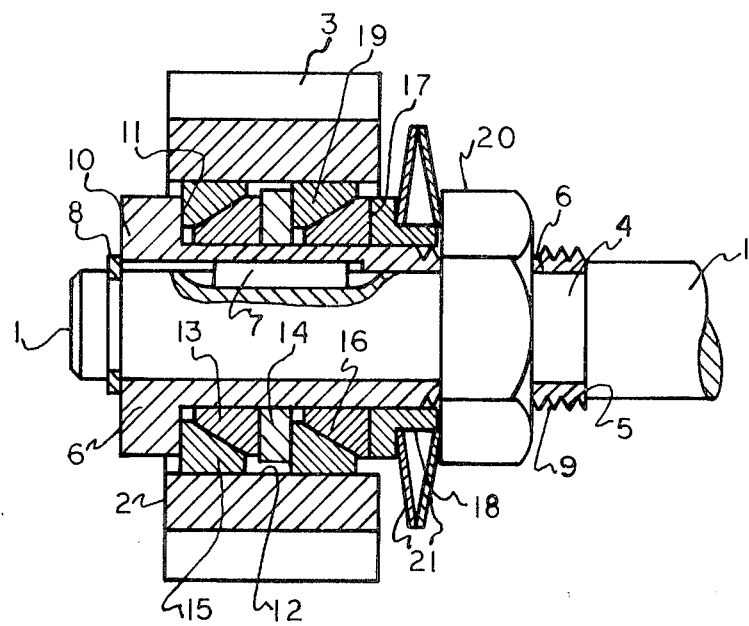
INVENTOR
ROGER GARCIA JR.
BY *J. F. McDevitt*
HIS ATTORNEY

OVERLOAD FRICTION COUPLING

BACKGROUND OF THE INVENTION

Overload friction couplings are well known, but usually components so that their addition to a standard torque transmitting element in a power train would considerably increase the dimensional requirements of the element and result in excessively high increase in the cost of the element. Such overload friction slip couplings are highly desirable or even necessary in power trains employed for many different purposes, for example in the power train for rotating a tank turret to prevent breakage in the event that the turret or a projection therefrom strikes an immovable object during rotation.

One known example of a prior art friction coupling having considerable space requirements and complexity employs a roller bearing for supporting a power train member, a sprocket, on a shaft with radially extending opposed plates frictionally clamping the sprocket with a predetermined overload torque value as determined by a pair of opposed Bellville springs pretensioned by a threaded nut. Considering the relatively narrow width of the sprocket, the side friction plates take up a considerable amount of room and the necessity of requiring separate bearings considerably increases the cost and complexity of the device.

Wedging rings have been used in the past in overload couplings, for example the Debrie U.S. Pat. No. 2,127,768, issued Aug. 23, 1938, but for a controlled spring clamping pressure, the spring loading mechanisms have required a considerable amount of space, for example as seen in the Hansen U.S. Pat. No. 1,373,810, issued Apr. 5, 1921.

Many power trains employ gears mounted on a shaft, which gears must have a predetermined tooth width to transmit the desired torque and a gear mounting that will provide secure support for the gear without undue canting or vibrations with respect to the shaft. Usually, power trains or transmissions are compactly constructed due to a space premium so that the splitting of the shaft to provide an overload coupling considerably increases the complexity and space requirements of the transmission.

SUMMARY

It is an object of the present invention to overcome the disadvantages in the prior art with respect to overload friction couplings, particularly, by providing a friction coupling that may be mounted in a minimum of space without unduly increasing the complexity of the device with which it is associated. Particularly, the coupling is well suited to be mounted between a transmission drive member, preferably a gear, and its supporting shaft. Besides providing torque transmittal between the shaft and the gear, the coupling of the present invention supports the gear about its inner periphery at axially spaced areas, particularly its axially opposite ends to concentrate the radial force at the axial ends of the gear to minimize canting and vibration with respect to the mounting shaft. Further, the coupling provides the mounting for the gear and the bearing for relative movement between the gear and its associated shaft, which bearing automatically compensates for any wear by being self-adjusting both inwardly and outwardly in the radial direction.

The coupling of the present invention employs two pairs of wedging rings that are axially spaced by a noncontracting and non-expanding washer. For each pair, an outer wedge ring is provided for expansion against an inner cylindrical surface of the gear to provide for radial torque transmittal and to provide a radial bearing, and an inner wedge ring that will contract into engagement with the cylindrical surface of a sleeve carried by a shaft to provide radial torque transmittal and to provide a radial bearing. The wedge rings of each pair are provided with cooperating frustoconical wedge surfaces that will produce the expansion and contraction upon being axially clamped by a pair of opposed Bellville springs pretensioned by a nut threaded on the sleeve.

Conventional, releasable mountings between a gear and a shaft will have a predetermined axial space requirement; the coupling of the present invention will have the same axial space requirements, or will be only slightly greater. The coupling of the present invention will not produce any additional radial space requirements. Bellville springs are preferred for their ability to provide a constant preloading over a wide temperature range, their minimum axial space requirements, and their wide range of axial force production over a relatively short axial deflection range. Because of the cooperation between the Bellville springs and wedge rings with cylindrical bearing surfaces, the torque response for the coupling of the present invention is substantially linear over a wide range of nut adjustment, and substantially constant for any particular adjustment over a wide range of environment temperatures. The main space requirement of the Bellville springs is in the radial direction, where space is normally available due to the radial extent of one of the coupled members, particularly a spur gear.

While the overload coupling of the present invention may be used between any torque transmitting members, it is particularly advantageous with respect to a spur gear due to its minimum increased space requirements as compared to the usual coupling for a spur gear on a shaft, its widely axially spaced circumferential pressure areas that will provide a rigid support for the gear with respect to rocking or canting of the gear about an axis transverse to the shaft, and the dual function in the cylindrical coupling surfaces of the rings with respect to providing radial plain bearings.

BRIEF DESCRIPTION OF THE DRAWING

Further objects, features and advantages in the present invention will become more clear with respect to the following detailed description of a preferred embodiment shown in the attached drawing.

The single FIGURE of the drawing is a cross-sectional view taken in a plane passing through the axis of rotation of the power transmission shaft.

DETAILED DESCRIPTION OF THE DRAWING

While specific structural details of a preferred embodiment will be described, which are of considerable importance in their own right, it is contemplated that the broader aspects of the present invention may take different forms, particularly with respect to further embodiments, variations and modifications. As shown in the drawing, the overload friction coupling is employed between a power transmission motor shaft 1 and a spur gear 2 having a plurality of peripherally arranged gear teeth 3.

For mounting purposes, the shaft 1 is provided with a reduced diameter portion 4 forming an axially facing shoulder 5 in axial abutting engagement with the right hand axial end of a generally tubular sleeve 6 telescopically received on the reduced diameter portion 4. The sleeve 6 and shaft 1 are rotational coupled together by conventional key 7 and withdrawal of the sleeve 6 in the left hand direction, as viewed in the drawing, is prevented by conventional snap ring 8. It is contemplated that the sleeve 6 may be secured to a shaft 1 by other means, for example, a shrink fit or welding.

At one axial end, sleeve 6 is provided with an external thread 9 and at its other axial end, it is provided with an outwardly extending annular abutment flange or collar 10 which has an axially facing radial abutment face 11. Between the thread 9 and the flange 10, the outer surface of the sleeve 6 is cylindrical, which surface cooperates with an inner cylindrical surface 12 of the gear 2 to form an annular coupling chamber. The shaft 1, sleeve 6, key 7 and snap ring 8 together form one rotatable member for cooperation with the other rotatable member constituted by the gear 2. Either rotatable member may be the drive member with the other being the driven member.

For torque transmittal and journaling between the gear 2 and sleeve 6, there are provided two axially spaced pairs of wedge rings. One pair of wedge rings includes an inner wedge ring 13 having an inner cylindrical surface in engagement with the outer cylindrical surface of the sleeve 6, a radially extending abutment surface in engagement with a plain circumferentially integral spacer washer 14, and a frustoconical or wedge surface in engagement with a correspondingly spaced frustoconical wedge surface on the outer ring 15 of the same pair, which outer ring 15 has a radially extending abutment surface in engagement with a face 11 on abutment 10 of the sleeve 6 and a cylindrical outer surface in engagement with the cylindrical inner surface 12 of the gear 2. The other wedge ring pair includes an inner wedge ring 16 that is identical to the inner wedge ring 13 to reduce its manufacturing cost and has its radially extending surface in engagement with a radially extending face 17 of an annular spring carrier 18. The outer wedge ring 19 of this second pair is preferably identical to the outer wedge ring 11 to reduce manufacturing cost and has its radially extending surface in engagement with the other side of the spacer washer 14. While each wedge ring 13, 15, 16, 19 in this particular embodiment is of a circumferentially continuous construction, each of said wedge rings could also be circumferentially discontinuous only at a single narrow gap, which may extend axially or at an angle thereto.

For applying and adjusting the torque transmitting pressures, a lock or adjusting nut 20 is screwed onto the threaded portion 9 of sleeve 6 to axially pretension an opposed or back-to-back pair of Bellville springs 21, which springs are in turn concentrically mounted on the spring carrier 18. The axial force produced by the pretensioning of the springs 21 is transmitted by the carrier 18 to axially clamp the wedge rings 13, 15, 16, 19 and spacer washer 14 against the face 11 of the flange 10. This axial clamping force is radially directed by the wedging or frustoconical surfaces of the wedge rings to expand the outer rings 15 and 19 against the cylindrical inner surface 12 of the gear 2, and to contact the inner wedge rings 13, 16 against the adjacent cylindrical outer surface of the sleeve 6. The force of this radial expansion and contraction is correlated to and adjusted by the degree to which the nut 20 is screwed onto the sleeve 6, that is the degree to which the Bellville springs 21 are pretensioned.

From the above, it is seen that the gear 2 is mounted on the sleeve 6 by cylindrical bearing surfaces that are axially spaced with respect to each other as determined by the spacer washer 14, which will prevent canting or rocking of the gear 2 about an axis transverse to the shaft 1. Even after repeated slippage or other wear, this bearing will still be tight due to the self-adjusting nature of the pretensioned springs 21 and wedge rings. Thus, this bearing will be even tighter than a normal plain radial bearing in that it is radially pretensioned. Further, the torque transmittal is radially accomplished by means of the pretensioned wedge rings and equally divided along the two axially spaced positions to evenly distribute the torque to the gear to further assure vibration free mounting of the gear with the advantages of a rigid coupling and a resilient coupling.

Due to the circumferentially integral nature of the ring 14 and a slight radial spacing between the ring 14 and both the cylindrical surface 12 of the gear 2 and the outer cylindrical surface of the sleeve 6, the spacer washer 14 will not transmit any radial torque, although it is free to rotate on the sleeve 6 for providing a balancing of the torque transmitted between the ring pairs. In this manner, the net radial forces on the spacer washer 14 will be substantially balanced due to the fact that one adjacent ring is contracting while the other adjacent ring is expanding and the engaging surfaces therebetween are radially extending.

Actual test results have shown that the slip torque level for a given axial load is consistent from one test to another, even under extreme temperature fluctuations. These consistent results are particularly due to the nature of the constant axial load produced for one adjusting position of the Bellville springs. For example, at 70° F. a test coupling slipped at a torque of 400 inch-pounds; at 160° F. the test coupling slipped at a torque of 410 inch-pounds; and at 200° F. the test coupling slipped at a torque of 380 inch-pounds. Over this relatively wide range of temperature fluctuations, the torque transmittal limit remained substantially constant. Even at the extreme temperature of −35° F., the maximum torque transmitted, or point of slippage occurred at 290 inch-pounds. It is contemplated that even better results can be obtained with special purpose lubricants between the rings and their associated elements. Further tests showed that the slip torque level is linear with axial load. Specific results were obtained with an axial load varying between 200 and 1,600 pounds for a single coupling, which produced a corresponding variation in slip torque between 50 inch-pounds and 400 inch-pounds, for eight successive substantially equal increment load variations.

Thus, it is seen that the overload friction coupling of the present invention derives space requirement advantages, substantially constant slip torque values over a wide temperature range, and a slip torque that varies linearly with adjusted axial load by the use of Bellville springs in cooperation with wedge rings. The wedge rings do not have any increased space requirements over those of a conventional gear mounting, and provide for an advantageous axially spaced distribution of the radial torque transmittal, a self-adjusting bearing, a vibration dampening bearing having axially spaced pressure points and a minimum number of parts for producing torque overload.

What is claimed as new and desired to be secured by Letters Patent of the United States is:

1. An overload friction coupling having an axis of rotation, comprising: a first rotatable member having an outer friction coupling surface; a second rotatable member having an inner friction coupling surface opposite said outer surface; at least one pair of inner and outer, contracting and expanding respectively, wedge rings constituting means for frictionally engaging between said outer and inner surfaces to transmit torque between said members when subjected to an axial clamping pressure; and Bellville spring means for exerting an axial clamping pressure on said rings, said Bellville spring means including a spring carrier ring having a tubular portion telescopically received on said first rotatable member and a Bellville spring mounted on said tubular portion, said carrier ring having an outer annular flange radially overlapping said Bellville spring between said spring and said wedge rings.

2. An overload friction coupling having an axis of rotation, comprising: a first rotatable member having an outer friction coupling surface; a second rotatable member having an inner friction coupling surface opposite said outer surface; at least one pair of inner and outer, contracting and expanding respectively, wedge rings constituting means for frictionally engaging between said outer and inner surfaces to transmit torque between said members when subjected to an axial clamping pressure; and Bellville spring means for exerting an axial clamping pressure on said rings; said surfaces being cylindrical; said rings including two pairs of rings; said first rotatable member including a shaft, a sleeve having said outer cylindrical surface, a threaded portion on said sleeve and an axial abutment on said sleeve, key means drivingly securing said sleeve on said shaft, axial abutment means preventing relative movement between said shaft and sleeve; said Bellville spring means including a spring carrier ring having a tubular portion telescopically received on said tubular portion, said carrier ring having an outer annular flange radially overlapping said Bellville spring between said spring and said wedge rings.

3. An overload friction coupling, comprising: a gear member having a plurality of external teeth and an inner surface; a rotatable member concentrically received within said gear member and having an outer surface substantially coextensive with and opposite from said gear member surface; said outer and inner surfaces being spaced from each other in the radial direction to form therebetween an annular chamber having opposed axial ends; an axial abutment at one axial end of said chamber and being drivingly connected to one of said members; a first pair of bearing and wedge rings at one axial end of said chamber directly engaging between said gear member inner surface and said rotatable member outer surface for respective expansion and contraction when subjected to an axial clamping pressure; a second pair of bearing and wedge rings at the other axial end of said chamber directly engaging between said gear member inner surface and said rotatable member outer surface for respective expansion and contraction when subjected to an axial clamping pressure; non-expanding and non-contracting spacing means between said first and second pairs, and being mounted for free axial movement without radial torque transmittal for spacing the radial pressure of said pairs at opposite ends of said gear member; and common means for providing an axial force for clamping said first and second ring pairs and spacing means against said axial abutment.

4. The coupling of claim 3, wherein said common means includes a threaded clamping nut, and two mirror image Bellville springs axially between said nut and said ring pairs.

5. The coupling of claim 4, including an annular spring carrier having a tubular portion mounting thereon said Bellville springs and an outer flange axially between said Bellville springs and said ring pairs.

6. The coupling of claim 3, wherein the opposite axial ends of said teeth are substantially radially aligned with the opposite axial ends of said ring pairs and chamber.

7. The coupling of claim 3, wherein said inner and outer surfaces are cylindrical.

8. The coupling of claim 7, wherein each pair of rings includes a first wedge ring having an outer cylindrical surface in direct engagement with said gear member inner cylindrical surface, a radially extending side surface and a frustoconical wedge surface, and a second wedge ring having an inner cylindrical surface in engagement with said outer cylindrical surface of said rotatable member, a radially extending side surface and a frustoconical wedge surface in engagement with said first-mentioned frustoconical wedge surface; and said spacer ring having opposed radially extending faces in engagement with the radially extending side surface of the adjacent ring of each pair of rings.

9. The coupling of claim 8, wherein said axial abutment has a radially extending side face in engagement with the radially extending side surface of the adjacent ring of one pair; and said common means including a portion having a radially extending face in engagement with the radially extending surface of the adjacent ring.

10. The coupling of claim 9, wherein the radially extending faces of said axial abutment and common means are in substantially radial alignment with the respective opposite axial ends of said gear member.

11. An overload friction coupling comprising a first member rotatable about an axis and having an outer friction coupling surface which is a surface of revolution about said axis; a second member rotatable about the same axis and said first member and having an inner friction coupling surface uniformly spaced from said outer surface to form a chamber; two pair of contracting and expanding wedge rings centered on said axis and lying within said chamber for permitting frictional drive between said rings and members, each said pair of rings having an inner and outer annular ring, said inner ring being in contact with said outer surface and said outer ring being in contact with said inner surface, said rings of each pair being in contact with each other through mating frustoconical surfaces; an annular free-floating spacer washer also located in said chamber centered on said axis between said pairs whereby each pair of rings is maintained proximate to a different remote axial end of said members; and spring means exerting clamping pressure axially of said device to force said rings into a predetermined frictional contact with each other and with said inner and outer surfaces; said spring means including shoulder means on one said member at one axial end of said chamber to provide abutment means for said ring closest that end, spring carrier means at the other axial end of said chamber having shoulder means providing abutment means for said ring closest that end and abutment means for a Bellville spring, adjustable stop means also attached to said one member and at least one Bellville spring between said stop means and said abutment means for said spring whereby said spring may be made to exert pressure on said rings axially of said device wedging said rings and said surfaces into frictional contact with each other.

* * * * *